United States Patent Office 2,899,444
Patented Aug. 11, 1959

2,899,444

SYNTHESIS OF TETRAHYDROTHIOPHENE

Bernard Loev, Philadelphia, and John T. Massengale, West Chester, Pa., assignors to Pennsalt Chemicals Corporation, a corporation of Pennsylvania No Drawing. Application April 3, 1957
Serial No. 650,287

10 Claims. (Cl. 260—329)

This invention relates to synthesis of a sulphur compound, and more particularly, to a process for the preparation of tetrahydrothiophene by reaction of tetrahydrofuran with hydrogen sulphide under conditions conducive to maximum yields with minimum color body formation.

Tetrahydrothiophene is used as an odorant for fuel gas, in which application it is of particular importance because of superior oxidation stability as compared to mercaptans used for this purpose. It is also of value as a chemical intermediate: the sulphoxide of tetrahydrothiophene is used to improve ignition characteristics of diesel fuel; the sulphone is useful as a solvent, in extraction of aromatic compounds from petroleum and in synthesis of polyacrylonitriles; chlorinated tetrahydrothiophene is used in preparation of insecticides, fungicides and germicides, and so forth.

A variety of syntheses of tetrahydrothiophene are proposed in the prior art. All of these procedures suffer from various disadvantages, such as expensiveness of reagents and low yields. Under conditions conducive to high yields, formation of color bodies has been observed. These are impurities of unknown composition which are probably reaction byproducts. To remove these colored impurities and purify the tetrahydrothiophene requires additional, troublesome and costly processing steps.

It is an object of this invention to provide a novel synthesis of tetrahydrothiophene.

A particular object of this invention is to provide a novel process for conversion of tetrahydrofuran to tetrahydrothiophene, by reaction of tetrahydrofuran with hydrogen sulphide in the presence of alumina as catalyst, whereby tetrahydrothiophene is obtained in high conversions and yields, in substantially colorless form.

A further object is to provide a synthesis of tetrahydrothiophene from tetrahydrofuran wherein the space velocity of the tetrahydrofuran is controlled so as to inhibit color body formation.

Another object is to provide a novel process comprising contacting tetrahydrothiophene with carbon disulphide in the presence of water to form tetrahydrothiophene.

These and other objects of the present invention will be apparent from a consideration of the following specification and claims.

In accordance with this invention, tetrahydrothiophene is prepared by reaction of tetrahydrofuran with hydrogen sulphide in the presence of alumina at a temperature of from about 350–380° C., preferably about 375° C., and at a tetrahydrofuran space velocity of from about 100 to about 110, preferably about 105 gas volume/catalyst volume/hour.

Under the presently described conditions, it has been found that tetrahydrothiophene is obtained in high yields and is separated from the reaction product as a clear, colorless product. The extremely pure, colorless product obtained is directly useful, without further processing, as a chemical intermediate, fuel odorant, or for other purposes for which tetrahydrothiophene is adapted.

Space velocity, a variable to which particular attention is directed in the present synthesis, is a measure of the rapidity with which a reactant is passed through the effective reaction zone, that is, the zone in which conditions, such as temperature, the presence of catalyst, and the like, are conducive to reaction. The higher the space velocity, the more reactant is passed through the reaction zone in a given time; accordingly, the higher the space velocity, the less time does any given portion of the reactants spend in the reaction zone, or, in other words, the shorter is the dwell time or contact time. For the present catalytic reaction, the catalyst bed forms the reaction zone, and space velocity is measured as the gaseous volume of reactant per volume of catalyst per hour, corrected to 0° C. and one atmosphere pressure. Catalyst volume is taken as the gross volume of the catalyst bed. Space velocity for the reaction of multiple reactants may be measured with respect to the totality of reactants, or as regards any individual reaction component. In accordance with this invention, it has been found that in the synthesis of tetrahydrothiophene, the tetrahydrofuran space velocity is an individually controlling factor.

In one embodiment of the invention, tetrahydrofuran is contacted with hydrogen sulphide in the presence of alumina as catalyst. The hydrogen sulphide should be present in excess, in a molar ratio, with respect to tetrahydrofuran, ranging from about 6:1 to about 2:1. A greater excess of hydrogen sulphide than about 6:1 generally does not improve the yields of tetrahydrothiophene obtained, and is therefore uneconomical, while the yield becomes less as the molar ratio decreases, and ratios below 2:1 are unfavorable.

If desired, part or all of the hydrogen sulphide employed as a reactant may be replaced by carbon disulphide. A reaction mixture comprising either (a) a mixture of tetrahydrofuran, hydrogen sulphide and carbon disulphide, or (b) a mixture of tetrahydrofuran, carbon disulphide and water may be used. Only half so much $CS_2$ is required as $H_2S$, on a molar basis to supply a molar equivalent quantity with respect to sulphur furnished, and the quantity of $CS_2$ employed is adjusted accordingly, to produce the S:tetrahydrofuran ratio of from about 2:1 to about 6:1 also preferred with hydrogen sulphide alone, as described above. Water need be present only in trace amounts in the reaction mixture, and may be supplied by the reaction of the tetrahydrofuran with the hydrogen sulphide. Effectively, it is believed, hydrogen sulphide, formed by reaction of carbon disulphide with water under the reaction conditions, is the active reagent producing conversion of the tetrahydrofuran to tetrahydrothiophene. Thus, where reference is made herein and in the appended claims to contacting tetrahydrofuran with hydrogen sulphide, this language is intended to refer to the use of reaction mixtures comprising hydrogen sulphide, or carbon disulphide in the presence of water, or mixtures of hydrogen sulphide and carbon disulphide. The use of carbon disulphide as a reactant has the advantage of eliminating the quantities of water formed as a reaction product by a reaction mixture employing hydrogen sulphide as the sulphur-containing reactant, and may lead, furthermore, to improved yields, under some reaction conditions.

The catalyst for the reaction comprising alumina, that is aluminum oxide. Generally, alumina itself will advantageously be employed to form the catalyst bed. The presence of adjuvants and promoters in the catalyst composition is usually unnecessary, but the use of substantially pure alumina is not required, and a technical grade of alumina, containing various impurities, such as thoria, silica or chromia, may be used if desired. Preferably, the catalyst is in granulated or pulverized form, and of a size ranging from about 30 mesh up to about one inch pellets; advantageously, about 14 mesh size up to ½ inch pellets of alumina will be used. Ordinarily special procedures to avoid problems of local overheating or poor heat transfer, such as the use of a fluidized catalyst bed, are not required, and the catalyst life usually is indefinitely long. As noted above, the catalyst bed size is a factor affecting the space velocity of the reactants, and will be adjusted accordingly, in relation to the reactor volume and the rate of gas flow of the tetrahydrofuran reactant.

The factors of temperature and space velocity are interrelated in their effect on the present reaction. In accordance with this invention, the conversion of tetrahydrofuran to tetrahydrothiophene in good yields and to produce a product substantially free of color bodies is carried out at a temperature of from about 350° to about 380° C., and at a tetrahydrofuran space velocity of from about 100 to about 110 gas volume/catalyst volume/hour. It has been found that either at a temperature of 400° C. or above, within the preferred space velocity range, or at a space velocity exceeding the presently preferred range, but at lower temperatures, the tetrahydrothiophene product obtained in accordance with this process is contaminated by colored impurities which are difficult or impossible to remove by purification processes such as distillation. On the other hand, when operated under the presently adduced conditions, the present process leads to formation of extremely pure tetrahydrothiophene, as a substantially colorless and water-white liquid product.

Temperature as referred to herein is the temperature of the reactants initially, as they contact the catalyst bed. Within the catalyst bed, the temperature is generally somewhat, irregularly, higher, by about 35–40° C., as a result of the heat evolved by the reaction. The preferred temperature of the reactants for the process is about 375° C. As the temperature is diminished, yields decrease, and temperatures below about 350° C. give unfavorably low yields. Above about 380° C., the formation of color bodies may occur.

As noted in the above discussion of space velocity measurement, at a high space velocity, the reactant spends less time in the reaction zone than at a lower space velocity. It would be expected that, the less time spent in the reaction zone, the less opportunity would there be for undesired side reactions to proceed. Thus, for example, in the conversion of an alcohol to a mercaptan by reaction with hydrogen sulphide, as the space velocity decreases, byproduct formation increases. It is side reactions and byproduct formation which are responsible for color body formation. Tto the contrary, however, it has been found that in the present reaction, low tetrahydrofuran space velocities, and consequent longer dwell times, favor production of a pure, colorless product. A tetrahydrofuran space velocity of from about 100 to about 110 gas volume/catalyst volume/hour is preferred. At lower space velocities, the decrease in throughput per unit time is commercially and economically undesirable, and the productivity of the process is diminished, while at space velocities above this range, color body formation is encountered.

In the present reaction, when hydrogen sulphide is the sole or chief sulphur-containing reactant, water is formed, as represented by the equation

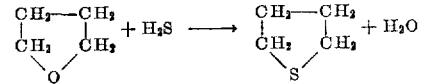

When the effluent from the reaction zone is condensed, water will be present in the condensate. If at least part of the hydrogen sulphide is replaced by carbon disulphide, water is consumed in hydrolysis of carbon disulphide to hydrogen sulphide and carbon dioxide, and the effluent will contain less aqueous component. In addition to water, besides product tetrahydrothiophene, the condensate may contain unreacted tetrahydrofuran and also, depending on the temperature of condensation, unreacted hydrogen sulphide. The tetrahydrothiophene may conveniently be separated from the condensate by distillation: tetrahydrofuran is distilled off at 50–70° C., water is azeotroped out at about 88° C., and tetrahydrothiophene is collected as a limpid, water-white product at 119° C.

It will be understood that in commercial operation, unconverted reactants may be recycled and the process made continuous if desired. Furthermore, instead of atmospheric pressure, the present process may be carried out at either sub- or super-atmospheric pressure.

In an illustrative operation, the description of which is non-limiting, the process of the invention is carried out as follows:

The apparatus employed is constructed of stainless steel and comprises metering feed pumps from which tetrahydrofuran and hydrogen sulphide are fed into a preheater tube in which the reactants are mixed and the tetrahydrofuran is gasified. The preheater tube leads into the top of a heated reactor tube, in which a horizontal catalyst bed of 8–14 mesh alumina lies across the path of the gaseous reactant mixture. The effluent from the reactor is passed through a condenser, cooled with ice or a Dry-Ice-acetone mixture, and collected in a chilled receiver.

In starting up, hydrogen sulphide is passed through the apparatus at the rate to be used in the reaction, for at least one hour, to condition the catalyst. The temperature just above the catalyst bed is adjusted to the desired reading by adjusting the temperature of the bath surrounding the reactor tube, and then the tetrahydrofuran is passed in at the rate used in the run.

In a one-inch diameter reactor tube, at a tetrahydrofuran flow rate of 0.01 mole per minute, a catalyst bed 1 inch in diameter and 10 inches deep is used to produce a tetrahydrofuran space velocity of 105 cc./cc./hr. In comparative runs, showing the effect of higher space velocities, a bed 1 inch in diameter and 3.5 inches deep is used at the same flow rate, to produce a space velocity of 300 cc./cc./hr. The total space velocity of the reactants varies, from 1500 cc./cc./hr. at a 4:1 H$_2$S/tetrahydrofuran ratio and a 300 cc./cc./hr. tetrahydrofuran space velocity to 315 cc./cc./hr. at a 2:1 H$_2$S/tetrahydrofuran ratio and a 105 cc./cc./hr. tetrahydrofuran space velocity. The passage of tetrahydrofuran into the reaction zone together with the hydrogen sulphide is continued for 4–6 hours, while the reactor effluent is collected in the condenser receiver.

When the introduction of reactants is terminated, the receiver is warmed to room temperature, whereupon the hydrogen sulphide is evolved. The water layer is separated from the crude product, after which the organic layer is distilled and tetrahydrothiophene collected.

In the following table are summarized a number of experiments carried out under varying conditions.

| H₂S/THF [1] | space THF [2] | temp., °C.[3] | conversion, percent [4] | color of distilled THF |
|---|---|---|---|---|
| 1.2:1 | 315 | 375 | 41 | yellow. |
| 2:1 | 315 | 375 | 56 | Do. |
| 3:1 | 300 | 380 | 59 | Do. |
| 4:1 | 300 | 400 | 70 | Do. |
| 2:1 | 300 | 400 | 67 | Do. |
| 2:1 | 105 | 410 | 63 | Do. |
| 5.5:1 | 105 | 410 | 86 | Do. |
| 6:1 | 105 | 375 | 94 | colorless. |
| 2:1 | 105 | 375 | 85 | Do. |
| [5] 2:1 | 105 | 375 | 90 | Do. |
| 2:1 | 105 | 350 | 71 | Do. |

[1] Molar ratio of hydrogen sulphide to tetrahydrofuran in feed.
[2] Space velocity of tetrahydrofuran, calculated as gaseous volume of tetrahydrofuran in cubic centimeters, per gross volume of catalyst in cubic centimeters, per hour.
[3] Reactor bath temperature.
[4] Conversion, based on tetrahydrofuran fed into system.
[5] 0.005 mole CS₂ plus 0.01 mole H₂S; the H₂S:CS₂:THF molar ratio is 1:0.5:1, giving an effective S:THF ratio of 2:1.

As will be evident from the above data, at a space velocity on the order of 300 cc./cc./hr. or above, only low conversions are obtained at varying temperatures and H₂S:THF ratios. At a space velocity of 105 cc./cc./hr., decreasing the temperature from 410° to 375° is found to increase the conversion, which is generally contrary to usual temperature effects in chemical reactions; as the temperature is further decreased, however, the expected drop in conversion produced is noted at 350° C. The hydrogen sulphide to tetrahydrofuran ratio is advantageously 6:1, for maximum yields, but good yields are obtained at down to 2:1. Finally, to obviate color formation, both temperatures and space velocities within the ranges specified herein are required.

While the invention has been described with reference to various particular preferred embodiments thereof, it will be appreciated that variations and modifications can be made within the scope of the appended claims.

What is claimed is:

1. In the process of preparing tetrahydrothiophene wherein tetrahydrofuran is reacted with hydrogen sulfide, the improvement whereby color body formation is avoided which comprises reacting said tetrahydrofuran with said hydrogen sulfide in a molar ratio, respectively, of from about 1:2 to about 1:6, at a temperature of from about 350° C. to about 380° C., in the presence of alumina as catalyst, and at a space velocity of said tetrahydrofuran with respect to said alumina of from about 100 to about 110 gas volume/catalyst volume/hour.

2. The process of claim 1 wherein said molar ratio is about 1:6.

3. The process of claim 2 wherein said temperature is about 375° C.

4. The process of claim 3 wherein said space velocity is about 105 gas volume/catalyst volume/hour.

5. The process of claim 4 wherein a mixture of said tetrahydrofuran and said hydrogen sulfide is passed into the presence of said alumina.

6. In the process of preparing tetrahydrothiophene wherein tetrahydrofuran is reacted with a sulphurizing agent, the improvement whereby color body formation is avoided which comprises reacting said tetrahydrofuran with a mixture of hydrogen sulphide and carbon disulphide, in a molar ratio of said tetrahydrofuran to the total sulphur in said mixture of hydrogen sulphide and carbon disulphide of from about 1:2 to about 1:6, at a temperature of from about 350° to 380° C., in the presence of alumina as a catalyst, and at a space velocity of said tetrahydrofuran in respect to said alumina of from about 100 to about 110 gas volume/catalyst volume/hour.

7. The process of claim 6, wherein said molar ratio is about 1:2.

8. The process of claim 7, wherein said temperature is about 375° C., and said space velocity is about 105 gas vol./catalyst vol./hour.

9. In the process of preparing tetrahydrothiophene wherein tetrahydrofuran is reacted with a sulphurizing agent, the improvement whereby color body formation is avoided which comprises reacting said tetrahydrofuran with carbon disulphide in the presence of water, in a molar ratio of said tetrahydrofuran to said carbon disulphide from about 1:1 to 1:3, at a temperature from about 350° to about 380° C., in the presence of alumina as a catalyst, and at a space velocity of said tetrahydrofuran with respect to said alumina of from about 100 to about 110 gas volume/catalyst volume/hour.

10. The process of claim 9, wherein said molar ratio is about 1:3, said temperature is about 375° C., and said space velocity is about 105 gas vol./catalyst vol./hour.

References Cited in the file of this patent

UNITED STATES PATENTS 2,539,325    Prochazka _____ Jan. 23, 1951

OTHER REFERENCES

Fischer: Chemical Abstracts, vol. 18, p. 1714[1] (1924). Abstract of: Biochemische Zeitschrift, vol. 141, pp. 540–4 (1923).

Hirao et al.: Chemical Abstracts, vol. 49, p. 6909e (1955). Abstract of: Journal of the Pharmaceutical Society of Japan, vol. 74, pp. 446–449 (1954).

Tronova et al.: Chemical Abstracts, vol. 45, p. 9424f (1951). Abstract of: Zhurnal Obschei Khimii (Journal of General Chemistry), vol. 21, pp. 742–9 (1951).

Dubrovina et al.: Chemical Abstracts, vol. 41, p. 1653i, and 1654a,b 1947). Abstract of: Journal of General Chemistry (U.S.S.R.), vol. 16, pp. 843–50 (1940).

Prokina et al.: Chemical Abstracts, vol. 31, p. 1399[1] (1937). Abstract of: Journal of General Chemistry (U.S.S.R.), vol. 7, pp. 1868–73 (1937).

UNITED STATES PATENT OFFICE

CERTIFICATE OF CORRECTION

Patent No. 2,899,444                         August 11, 1959

Bernard Loev et al.

It is hereby certified that error appears in the printed specification of the above numbered patent requiring correction and that the said Letters Patent should read as corrected below.

Column 3, line 9, for "comprising" read -- comprises --; line 69, for "Tto" read -- To --; column 5, in the table, heading to column 5 thereof, for "color of distilled THF" read -- color of distilled tetrahydrothiophene --.

Signed and sealed this 25th day of October 1960.

(SEAL)
Attest:

KARL H. AXLINE                               ROBERT C. WATSON
Attesting Officer                             Commissioner of Patents